March 8, 1966 A. A. GOFFSTEIN 3,238,796

PUSH BUTTON TUNER

Filed March 23, 1964 2 Sheets-Sheet 1

INVENTOR
ALBERT A. GOFFSTEIN

BY Robert M. Dunning
ATTORNEY

March 8, 1966 A. A. GOFFSTEIN 3,238,796

PUSH BUTTON TUNER

Filed March 23, 1964 2 Sheets-Sheet 2

INVENTOR

ALBERT A. GOFFSTEIN

BY Robert M. Dunning

ATTORNEY

United States Patent Office 3,238,796

Patented Mar. 8, 1966

3,238,796

PUSH BUTTON TUNER

Albert A. Goffstein, St. Paul, Minn., assignor to ATR Electronics, Inc., St. Paul, Minn., a corporation of Minnesota Filed Mar. 23, 1964, Ser. No. 353,863

2 Claims. (Cl. 74—10.27)

This invention relates to an improvement in pushbutton tuner and deals particularly with an attachment for a pushbutton tuner which permits the tuner to be used with various escutcheon plates used in automobiles of different makes and models.

Pushbutton tuners are often incorporated in conjunction with radio receiving sets used in passenger vehicles and the like. In many instances, the same radio receiving set and pushbutton tuner are used in automobiles of various makes and models. However, the escutcheon plates which are used in the various makes and models of cars differ in appearance and design in order to fit the interior decoration of the car in which it is installed. These escutcheon plates usually are provided with a window through which the tuning scale may be viewed as well as a pointer indicating the point on this scale to which the radio is tuned. The escutcheon plates also are provided with an aperture or apertures through which the pushbuttons extend. These apertures and scales are usually quite similar in size and location. The escutcheon plates usually also include a pair of spaced apertures through which the shanks or shafts of the controls of the radio may extend. One such control usually comprises the shank of a potentiometer serving as a volume control and switch by means of which the radio circuit may be turned on and off. A tone control may also be incorporated on the same shaft. The second operating shaft is normally designed to support a knob by means of which the radio may be manually tuned. The distance between these shaft axes varies in different escutcheon plates so that variations in the manual control of the tuner are necessary in order to permit control through the rotation of shafts which are spaced apart at varying distances.

Most modern pushbutton tuners are manually tuned by rotation of a tuning shaft which extends on an axis generally parallel to the plane of the escutcheon plate. A gear is mounted upon this transversely extending tuning shaft, the gear having its teeth on the edge of a cylindrical flange projecting concentrically from the periphery of the disklike body of the gear. These teeth are engaged by a pinion mounted on a shaft parallel to the control shaft extending through the escutcheon plate. The control shaft and the parallel shaft bearing the pinion are connected by intermeshing gears or disks on the two shafts. Automatic declutching means are usually provided between the pinion and the transverse tuning shaft by means of which the manual tuning knob, the control shaft, and the parallel shaft may be disconnected from the transverse tuning shaft when the radio is tuned by the pushbuttons. Due to variations in the location of the manual control shaft which extends through the escutcheon plate, the size of the intermeshing gears or disks connecting the manual control shaft and the parallel shaft must be varied for use with different escutcheon plates. As a result, it is necessary to modify each tuner to fit with the corresponding escutcheon plate. It is an object of the present invention to provide a radio of the type described having a mounting plate designed to lie inwardly of the vehicle control panel and which includes a pair of transversely elongated slots on opposite sides of the radio dial and pushbutton elements through which the shafts of the radio controls may extend. The shaft of the switch and volume control may be inserted through one of these slots and through an aperture in the escutcheon plate which overlies the instrument panel of the vehicle. As this control is connected to the remainder of the radio only by flexible wires, the position of the unit may be adjusted throughout the length of the slot to fit the particular escutcheon plate with which it is used. Where no external escutcheon plate is used, the position of the control shafts may be varied to extend through the instrument panel apertures.

The other control shaft comprises the manual tuning control and this member is adjustably positioned in the other slot in proper position to extend through the other opening in the escutcheon plate. This manual tuning control shaft is connected by a short flexible shaft to a pinion assembly engageable with the gear on the transverse tuning shaft of the radio to permit the manual tuning of the radio through the medium of the flexible shaft. The arrangement is such that the manual tuning control which projects through the escutcheon plate may be adjusted at any position throughout the length of its slot while still connected to the pinion assembly for rotating the tuning gear. Thus the same mounting plate and the same tuner may be used with various escutcheon plates without modification.

A further feature of the present invention resides in the particular manner in which the pinion assembly is disengaged from the tuning gear automatically as the pushbuttons are actuated. As a result, the present structure has all of the advantages of the conventional tuners, and has the additional advantage that the same structure may be employed without modification in conjunction with escutcheon plates of different lengths.

These and other objects and novel features of the invention will be more clearly and fully set forth in the following specification and claims.

In the drawings forming a part of the specification:

Figures 1, 2, 3, 4, 5:
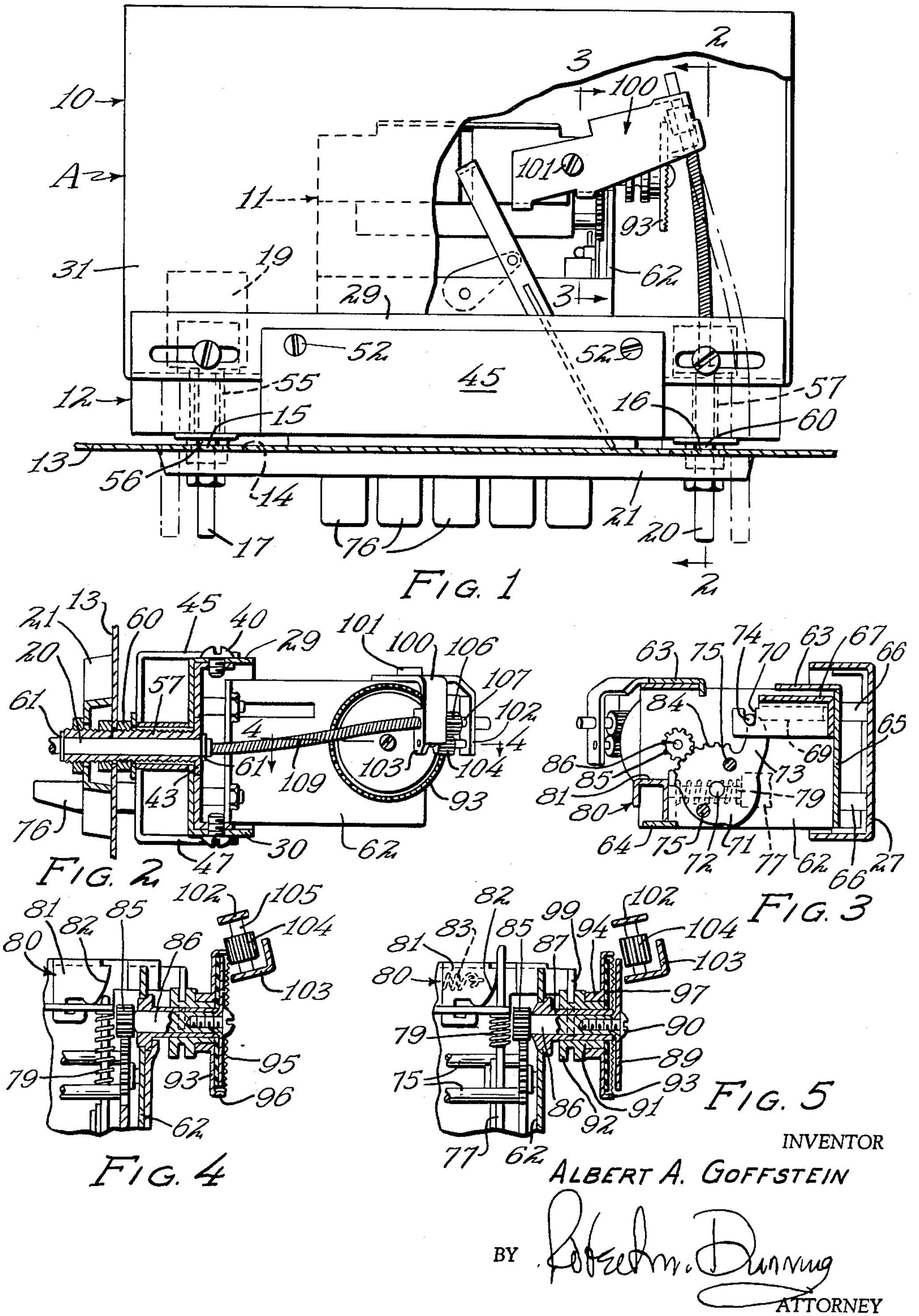
FIGURE 1 is a diagrammatic top plan view showing the radio and tuning unit diagrammatically.
FIGURE 2 is a vertical sectional view, the position of the section being indicated by the line 2—2 of FIGURE 1.
FIGURE 3 is a vertical sectional view through a portion of the apparatus, the position of the section being indicated by the line 3—3 of FIGURE 1.
FIGURE 4 is a horizontal sectional view through a portion of the apparatus, the position of the section being indicated by the line 4—4 of FIGURE 2.
FIGURE 5 is a view similar to FIGURE 4 showing the parts in a somewhat different position.
Figure 6:
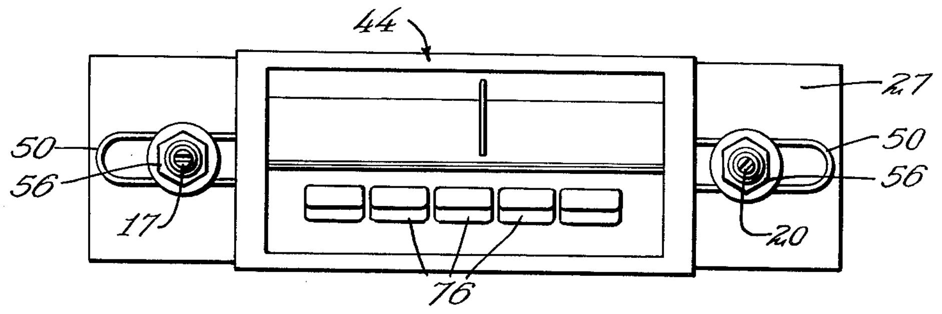
FIGURE 6 is a front elevational view of the unit with the escutcheon plate omitted to better illustrate the mounting plate.

In the following description, the escutcheon plate has been described as overlying the instrument panel. In some instances, a bezel is attached to the radio and extends through an aperture in the instrument panel. Furthermore, the present invention is applicable to manual tuning radios without the pushbuttons.

In the following description, a considerable portion of the apparatus disclosed and described is shown in the patent illustrated to Russell D. Stamm issued August 22, 1961, as Patent 2,996,925. The patent is assigned to one of the few companies supplying pushbutton tuners to radio manufacturers and much of the construction is conventional. However, certain parts of the tuner have been at least briefly described in order that the present invention be understood.

The pushbutton radio receiving sets, generally illustrated by the letter A, are constructed in metal enclosures of the type generally illustrated by the numeral 10 and include the pushbutton tuner unit which is indicated in general by the numeral 11. The forward side of the radio case 10 includes some sore of mounting plate structure which is indicated in general by the numeral 12 and which is usually mounted against the forward surface of the instrument panel and is concealed thereby.

The instrument panel is indicated diagrammatically by the numeral 13 and is apertured as indicated at 14 so that the tuning scale, tuning pointer and the pushbuttons may be visible forwardly of the instrument panel. The instrument panel 13 is usually also provided with a pair of spaced apertures 15 and 16 on opposite sides of the aperture 14 through which the shaft 17 of the switch and volume control 19 may extend and through which may also extend the shaft 20 adapted to accommodate the manual tuning knob, not illustrated in the drawings.

An escutcheon plate 21 is supported rearwardly of the instrument panel to overlie the visible surface of the panel. The escutcheon plate 21 may be shaped to suit the interior decoration of the car, the plate 21 illustrated in FIGURE 7 being typical. The escutcheon plate 21 includes an upper aperture 22 through which the frequency scale may be viewed and through which the pointer indicating the position of the tuning mechanism may be seen. A second parallel aperture 23 is provided through which the pushbuttons forming a part of the tuning keys may extend. The ends of the plate are provided with bosses 24 which are apertured as indicated at 25 and 26 to accommodate the volume control shaft 17 and the manual tuning shaft 20. If all of the escutcheon plates 21 were of standard design, the present invention would be of lesser value. However, the automobile manufacturers prefer that each make of vehicle have its own design of escutcheon plate and the distance between the apertures 25 and 26 in the escutcheon plates for different cars varies. This variation in spacing makes little difference insofar as the position of the switch and volume control 19 is concerned, as this element is usually connected to the remaining elements of the radio receiving set by flexible wires. However, the position of the aperture 26 through which the tuning shaft 20 extends is of importance, as this shaft 20 is usually connected to the transverse tuning control shaft of the radio through a parallel shaft which is connected by intermeshing gears or disks which function as gears with the control shaft and which is connected to the transverse tuning shaft by a pinion and gear so that this portion of the tuning unit must be modified to suit each position of the shaft 20. In other words, the diameters of intermeshing gears or disks employed depend upon the specific spacing of the apertures 25 and 26 in the escutcheon plate 21. The purpose of this explanation is to bring out the very material advantage which is presented by the applicant's construction, as contrary to the previous sets, the applicant's unit will be used with virtually any type of escutcheon plate used on such sets commonly at this time.

Figure 7:
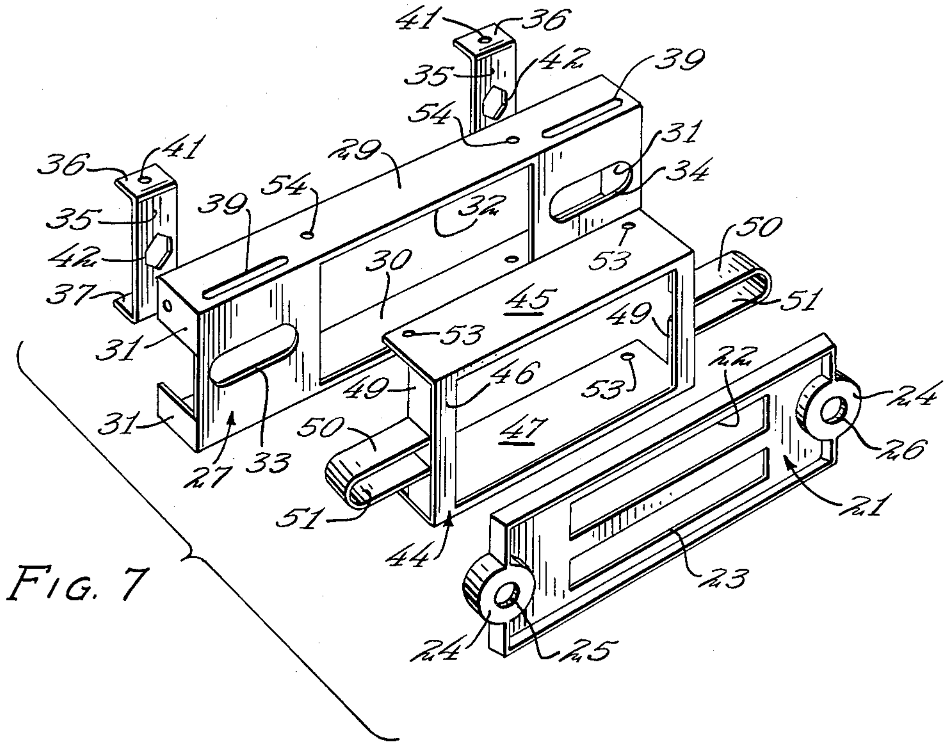
FIGURE 7 is an exploded view of the forward portion of the radio mounting showing the general arrangement of parts therein.

FIGURE 7 of the drawings discloses the forward portion of the applicant's radio enclosure 10. To provide the proper orientation, the elements shown in FIGURE 7 will be described as comprising the forward end of the radio cabinet, for while this structure is directed rearwardly when mounted in the instrument panels, it actually forms the forward wall of the enclosure. The mounting plate structure 12 includes a mounting member, later described, and an enclosure forward end wall 27 which includes a top flange 29 and a bottom flange 30 designed to telescope on to the body 28 of the enclosure 10. The structure also includes side wall portions 31 designed to telescope with the sides of the enclosure body 28. A rectangular aperture 32 is provided in the front wall 27 through which the tuning pointer and pushbuttons may extend. On opposite sides of the aperture 32, transversely elongated slots 33 and 34 are provided to accommodate the volume control shaft 17 and tuning shaft 20. Mounting clips 35 having top and bottom flanges 36 and 37 fit between the top and bottom walls 29 and 30 and against the rear side of the front wall 27. Transversely elongated slots 39 are provided in the top wall 29 and the bottom wall 30. Fastening screws 40 (see FIGURE 2) may extend through the slots 39 and into internally threaded apertures 41 in the top and bottom flanges 36 and 37 to hold the clips 35 in adjusted relation. The forward walls of the clips 35 are shown as including hexagonal apertures 42 which are designed to encircle nuts such as 43 (FIGURE 2) at the rear end of the volume control shaft 17 and tuning shaft 20. The nuts 43 at the rear ends of bearings encircle the tuning shaft 20 and control shaft 17 as will be later described. The purpose of the clips 35 is to hold the shafts at right angles to the forward wall 27 and also to hold the supporting bearings from rotation.

The mounting plate structure 12 also includes a mounting member illustrated in general by the numeral 44 and which is adapted to partially overlie the forward wall assembly which has been described. As a matter of fact, the unit 44 may be made integrally with the forward wall of the radio enclosure in some instances. The unit 44 includes a top plate 45, a front plate 46 and a bottom plate 47 which is parallel to the top plate 45. End plates 49 partially close the ends of the channel shaped structure described and include laterally projecting U-shaped extensions 50 which define slots 51 which are substantially co-extensive with the slots 33 and 34. The top and bottom plates 45 and 47 are secured overlying the top and bottom plates 29 and 30 of the enclosure end plate and are secured thereto by fastening bolts 52 (FIGURE 1) and which extend through apertures 53 in the walls 45 and 47 of the element 44 and into cooperative apertures 54 in the top and bottom walls 29 and 30.

From this description, it should be evident that the shaft 17 of the volume control and switch unit 19 may pass through the aperture 42 in the clip 35, through the slots 33 and 51, and through the aperture 25 in the escutcheon plate. While not illustrated in detail, an externally threaded bearing sleeve 55 is held from axial movement on the control shaft 17 and extends through the various apertures mentioned, the sleeve being held in place by a nut, not illustrated, engaging the rear surface of the front wall 27 and being held from rotation by the aperture 42 in the clip 35, and by a nut 56 engaging the forward edge of the U-shaped member 50.

As is indicated in FIGURE 2 of the drawings, the tuning shaft 20 extends through a bearing sleeve 57 having a nut 43 at its rear end which engages against the rear surface of the front panel 27 of the closure which nut is held from rotation by engagement in the aperture 42 of the clip 35. The sleeve 57 extends through the slot 34 in the front panel 27, through the slot 51 in the element 44 and is held in place by a locking nut 60 threaded on to the sleeve. Retaining washers 61 hold the shaft 20 from axial movement within the sleeve 57.

From this description, it will be evident that the position of the shafts 17 and 20 may be varied to fit various styles of escutcheon plates. The manner in which the control shaft 20 functions to tune the tuner 11 will now be described. The description of the tuning unit will be materially simplified to describe only parts of the tuner which are concerned with the present invention.

The tuner 11 is enclosed in a frame including side plates 62 connected by partial top plates 63 and partial bottom plate 64 and an apertured front plate 65. The front plate 65 is connected to the front panel 27 of the radio enclosure by bolts or similar means extending through spacers 66.

In the particular tuner illustrated, the tuning is accomplished by sliding movement of cores cooperating with permeability tuned coils. While not illustrated in the drawings, the cores are arranged in parallel relation and are moved away from and toward the front wall 65 in unison by a cross head 67 slidably supported in parallel slots in the end walls 62. The sides of the crosshead are provided with U-shaped notches 70. A pair of disks 71 are pivotally connected in axial alignment to the end plate 62 as indicated at 72 and each disk includes a projecting arm 73 which supports a roller 74 engageable in a corresponding notch 70. Reciprocation of the cross head 67 is accomplished by oscillation of the disks 71.

The disks 71 are connected for rotation in unison by a pair of rocker arms 75 which are on diametrically opposite sides of the disk pivots 72. While indicated only diagrammatically in the drawings, the manually operable pushbuttons 76 are mounted on the forward ends of slidable keys 77 urged toward projected position by springs 79. A declutching member 80 is slidably supported by the end plates 62 for movement in a lateral direction, and the upper flange 81 of this declutching unit is provided with a series of cam surfaces 82 which may be engaged by the keys 77 as they are depressed. A spring 83 normally biases the declutching member 80 to the right as indicated in FIGURES 4 and 5. However, as each key 77 is depressed, it engages the cam surface 82 to force the declutching unit to the left against the tension of the spring 83.

While not illustrated, each of the keys supports a cam element which is engageable against both of the rocker arms 75. The arrangement is such that as the key is depressed, one side of the cam will engage one of the rocker arms, and will pivot the disk 71 in a desired direction until the other end of the cam engages the other rocker arm which determines the proper angular relation of the disk 71 to tune the slugs to the proper position. It is in this manner that the pushbuttons tune the receiving set to the proper station.

Manual tuning of the set independently of the pushbuttons is also provided. An area of the periphery of one of the disks 71 is provided with angularly spaced teeth 84 which are in mesh with a pinion 85 mounted on a shaft 86 extending through the adjacent side wall 62 of the tuning unit 11. The shaft 86 provides a rotatable manual tuning member and is supported by a bearing sleeve 87 mounted on the side wall 62. A disk 89 is secured to the end of the shaft 86 by a cap screw 90 or other suitable means, the disk 89 rotating with the shaft 86. A sleeve 91 is rotatable and axially slidable on the bearing 87. The sleeve 91 includes a grooved clutch collar 92 of increased diameter. A gear 93 has its hub 94 secured to the sleeve 91. The teeth 95 of the gear 93 are arranged in peripheral cylindrical flange 96 projecting beyond the disk 89 in normal position of the gear 93.

The gear 93 is provided with a friction surface 97 engageable with a surface of the disk 89. The declutching unit 80 is provided at its end with a right angularly turned extension 99 engageable in the grooved clutch collar 92. As the declutching unit 80 is normally urged to the right as viewed in FIGURES 4 and 5, the gear 93 is normally urged against the disk 89 causing rotation of the shaft 86 in unison with the rotation of the gear 93. Rotation of the shaft 86 acts through the pinion 85 to rotate the disks 71 and to thereby reciprocate the tuning unit cross head 67. However, when any of the keys 76 are depressed, the declutching unit 80 is moved from the position shown in FIGURE 4 to the position shown in FIGURE 5, thus disengaging the friction surface 97 from the disk 89 and permitting the tuner to be actuated without driving the gear 93 and manual tuning knob connected thereto as will be described.

A bracket 100 is secured to the tuning unit by any suitable means as by the bolt 101, the bracket 100 overlying the gear 93. The bracket includes a pair of downwardly extending arms 102 and 103 which have portions in spaced parallel relation. A pinion 104 is supported upon a pintle 105 between the bracket arms 102 and 103. And this pintle may comprise the drive shaft connected to the tuning shaft 20 if so desired. However, as it is customary to rotate the tuning knob of most radios in a clockwise direction to tune in stations of higher frequency, the pinion 104 is an idler pinion in mesh with a second parallel pinion 106 mounted between the bracket arms 102 and 103 on the end 107 of a flexible shaft 109.

The end 107 of the flexible shaft is purposely elongated beyond the bracket arm 102, and the pinion 106 is purposely narrower than the space between the bracket arms 102 and 103 to permit the flexible shaft to be supported at any point throughout the length of the slot 51. At the same time, the pinions 104 and 106 are designed to mesh properly in any position of the pinion 106.

The other end of the flexible shaft is secured axially to the tuning shaft 20 so that rotation of the tuning shaft 20 will act through the pinions 106 and 104 to rotate the gear 93 frictionally engaged with the shaft 86 through the friction surface and disk 89.

It will be noted that the declutching unit not only removes the friction surface 97 of the gear 93 from the disk 89, but also actually disengages the teeth 95 of the gear 93 from the teeth of the pinion 104. As a result, the tuning shaft 20 and the pinions which it drives through the flexible shaft are positively disengaged from the gear during the declutching process.

As will be evident from the foregoing description, the unit described may be used in conjunction with a wide variety of escutcheon plates. In order to change the position of the controls, it is only necessary to loosen the cap screws 40 connecting the clips 35 in adjusted position and loosening the nuts 56 and 60. The shafts 17 and 20 may then be adjusted to proper position and the screws and nuts again tightened. This arrangement eliminates the necessity of varying the length of the tuning shaft 20 extending laterally into the tuning unit, and avoids the necessity of changing the portions of the various elements mounted thereupon. Such modification has previously been necessary.

While I have described a particular form of construction, the details may be varied while still using the flexible shaft connection. The particular form of gear employed and the particular bracket arrangement may be varied without changing the scope of the invention.

The foregoing description is specific to a push button tuner; however the present attachment is also useful in conjunction with manual tuning radios. Such tuners may be very similar to the tuner illustrated, except for the fact that the push buttons and the clutch operated thereby may be eliminated.

In accordance with the patent statutes, I have described the principles of construction and operation of my improvement in "Push Button Tuner," and while I have endeavored to set forth the best embodiment thereof, I desire to have it understood that changes may be made within the scope of the following claims without departing from the spirit of my invention.

I claim:

1. In combination with a panel mounted radio receiver set including a supporting frame adapted to be positioned on the rear surface of a panel, a push button tuner unit mounted on said frame and including a series of push buttons projecting forwardly therefrom, the panel including an intermediate aperture through which said push buttons may extend and laterally spaced control shaft apertures on opposite sides of said intermediate aperture which may vary in lateral spacing with various installations, and a rotatable manual tuning member on said tuner including a manually rotatable tuning shaft extending operable, upon rotation, to adjust the tuning of said tuner, an apparatus for compensating for various panels including:

(a) a mounting plate secured to the forward side of said supporting frame, (b) said mounting plate including an intermediate aperture through which said push buttons extend, and including laterally extending slots of a length sufficient to compensate for various escutcheon plates, (c) a volume control shaft extending forwardly from said supporting frame adjustably supported in one of said slots and extending through one of said control shaft apertures in said panel, (d) said rotatable tuning shaft extending through the other of said slots and extending through the panel and the other of said control shaft apertures, (e) an elongated flexible shaft axially connected at one end to said rotatable tuning shaft to transmit rotary movement from said tuning shaft to said rotatable manual tuning member, (f) a pinion gear on the other end of said flexible shaft, (g) an idler pinion engaged with said pinion gear, (h) a friction disk on said rotatable tuning member and rotatable therewith, (i) a clutch sleeve axially slidable on said tuning member, (j) a drive gear attached to said sleeve, (k) a surface of said drive gear frictionally engageable with said disk in one slidable position of said sleeve, (l) means operable by operation of any of said push buttons engaging said clutch sleeve to slide the drive gear out of engagement with said friction disk, (m) means supporting said pinion gear and idler pinion, said idler pinion being in fixed engagement with said drive gear when said drive gear is engaging said disk and out of engagement with said drive gear when said drive gear is engaging said disk and out of engagement with said drive gear when said drive gear is out of engagement with said disk, (n) said pinion gear and said idler pinion being supported on an axis fixed relative to said tuner unit, (o) said means supporting said pinion gear and said idler pinion including a pair of spaced arms in angled relationship; one of said arms having a portion in parallel relation to the other arm, said portion and other arm having aligned apertures therein, (p) said other end of said flexible shaft extending through a pair of said apertures and axially slidable and rotatable therein, (q) said pinion gear and said idler pinion having axial lengths of less than the distance between said portion and other arm; said pinion gear being secured on said flexible shaft portion between said portion and other arm; said idler pinion mounted on a shaft between said portion and other arm; said shaft extending through another pair of said apertures, (r) axial movement of said sleeve in one direction simultaneously disengaging said drive gear from said disk and said pinion gear.

2. The structure of claim 1 and in which said means supporting said pinion gear and idler gear are adjustable angularly relative to said drive gear whereby said pinion gear and said idler gear are correspondingly positioned relative to said drive gear.

References Cited by the Examiner

UNITED STATES PATENTS

| | | | |
|---|---|---|---|
| 2,494,008 | 1/1950 | Schwarz et al. | 74—10.33 |
| 2,734,386 | 2/1956 | Schroeder | 74—10.33 X |
| 2,953,927 | 9/1960 | Race | 74—10.27 |

MILTON KAUFMAN, *Primary Examiner.*

BROUGHTON G. DURHAM, *Examiner.*